United States Patent [19]

Hellmer et al.

[11] 4,397,625
[45] Aug. 9, 1983

[54] IN-MOLD LABELLER

[75] Inventors: Ernest W. Hellmer; George F. Bartimes, both of Chicago, Ill.

[73] Assignee: The Continental Group, Inc., Stamford, Conn.

[21] Appl. No.: 311,481

[22] Filed: Oct. 14, 1981

[51] Int. Cl.³ .............................................. B31B 1/12
[52] U.S. Cl. .................................... 425/135; 264/509; 425/145; 425/150; 425/503; 425/504; 425/522; 425/540
[58] Field of Search ............... 425/135, 145, 150, 503, 425/504, 522, 540; 264/509

[56] References Cited

U.S. PATENT DOCUMENTS 3,292,209 12/1966 Borkmann ............................ 264/509
3,324,508 6/1967 Dickinson ............................. 264/265
3,657,405 4/1972 Langecker ............................ 264/509

Primary Examiner—Maurice J. Welsh

Attorney, Agent, or Firm—Charles E. Brown

[57] ABSTRACT

This relates to a labeller for applying labels to the cavities of mold halves of a rotating blow molding machine whereby when a parison is blow molded within each mold thereof to form a bottle or like hollow article, each such article will be provided with at least one and preferably two labels. The labeller is provided with pick-up heads to pick up labels from two opposed hoppers and then move the labels in between the paths of rotation of mold halves and with proper timing advance the labels into the mold half cavities and discharge them on the walls of the mold cavities. Control circuitry is provided for the automatic operation of the labeller whereby not only can the labeller operate without interference with the moving mold halves, but also accurately position the labels within the cavities. This abstract forms no part of the specification of this application and is not to be construed as limiting the claims of the application.

24 Claims, 13 Drawing Figures

IN-MOLD LABELLER

This invention relates in general to apparatus for applying labels to containers, and more particularly to an apparatus for applying labels to blow molded containers by applying the labels to the blow mold cavities in advance of the blow molding of a parison to the desired blow molded container configuration.

At the present there is a requirement by many packagers that the label be applied to both the front and back of a container and that the labels be accurately positioned. Inasmuch as the labels must be applied to moving mold halves and since the window for applying the labels to the mold halves is relatively short, there must be provided a labeller mechanism which functions very quickly and accurately and which will assure that both labels are applied to the two mold halves.

In accordance with this invention, there is provided a labeller which includes a supporting frame that may be accurately mounted on an existing blow molding machine and which labeller includes a carriage carrying a pair of oppositely facing label pick-up heads. The carriage is mounted for movement between first and second positions where the pick-up heads are first aligned with label hoppers and then with blow mold halves. When the pick-up heads are aligned with either the hoppers or the blow mold halves, the pick-up heads are projected or extended first to engage stacks of labels with each pick-up head removing a label from its respective stack, and when aligned with moving blow mold halves, applying such labels.

In order that the labeller will not function unless a label is carried by each pick-up head, there is provided a sensor which will determine whether the vacuum to suction cups which engage and pick up the labels is at the proper level indicating the adherence of a label to each of the pick-up heads before the labeller will move from its position aligned with the pick-up heads to transfer the labels to the blow mold halves.

There is also provided sensors to sense the relative position of the blow mold halves with respect to the labeller to assure alignment of the pick-up heads and the labels carried thereby when the labels are being applied.

A further feature of the invention is the simple mounting of a carriage within a support frame and the mounting on the carriage of the pick-up heads wherein stability of the pick-up heads is assured in all operating positions while there is a minimum restriction to the movement of the carriage and pick-up heads as well as the movement of the pick-up heads relative to the carriage.

A further feature of the invention is the securing of each pick-up head to an extensible support therefore utilizing break-away fasteners whereby should a pick-up head be in the way of an advancing mold half and the pick-up head be struck by such mold half, the break-away fastener will permit the pick-up head to separate from its support and thereby minimize damage to the labeller.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1a is an elevational view with parts broken away and shown in section of a typical bottle having labels applied thereto in accordance with this invention.

Figure 1:
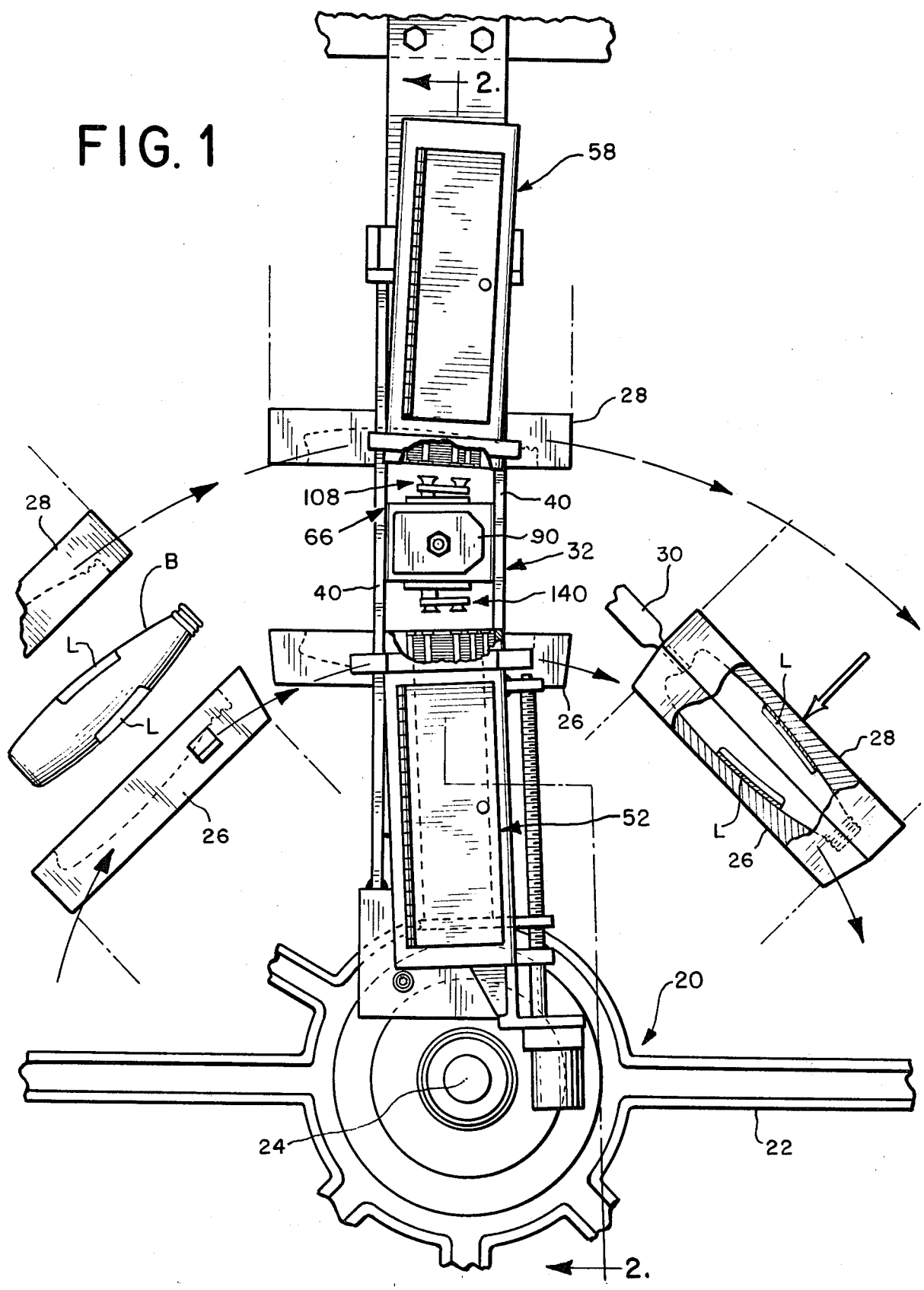
FIG. 1 is a fragmentary schematic elevational view of a conventional blow molding machine having mounted thereon the labeller of this invention, the view having been rotated 45° in a counterclockwise direction so that the labeller is illustrated in a vertical position.

Referring now to the drawings in detail, it will be seen that there is schematically illustrated in FIG. 1 a conventional blow molding machine generally identified by the numeral 20. The machine 20 includes a wheel-like frame 22 which is journalled for rotation on a shaft 24. The frame 22 carries plural sets of blow mold halves with each half including a fixed inner half 26 and a radially movable outer half 28. The outer mold halves 28 are mounted for radial movement and have cam follower means associated with cams (not shown) for effecting the opening and closing of the molds.

This invention most particularly relates to a blow molding machine for blow molding a bottle B which is best illustrated in FIG. 1a. In accordance with the usual practice, a parison 30 in the form of a continuously extruded plastic tube is gripped within a mold with the ends thereof pinched to seal the same, after which a blowing gas, preferably air, is directed into the sealed parison and an article is blow molded in accordance with the configuration of cavities of the mold halves. It is to be understood that the parison 30 is normally vertically disposed and that the same is ejected from an extruder (not shown).

This invention relates to a labeller, generally identified by the numeral 32, for applying labels L in the cavities of the blow mold halves 26, 28 so that when the parison 30 is blow molded within a respective mold to form the bottle B of FIG. 1a, the labels L will be seated in the surface of the bottle as is best shown in FIG. 1a.

Figure 2:
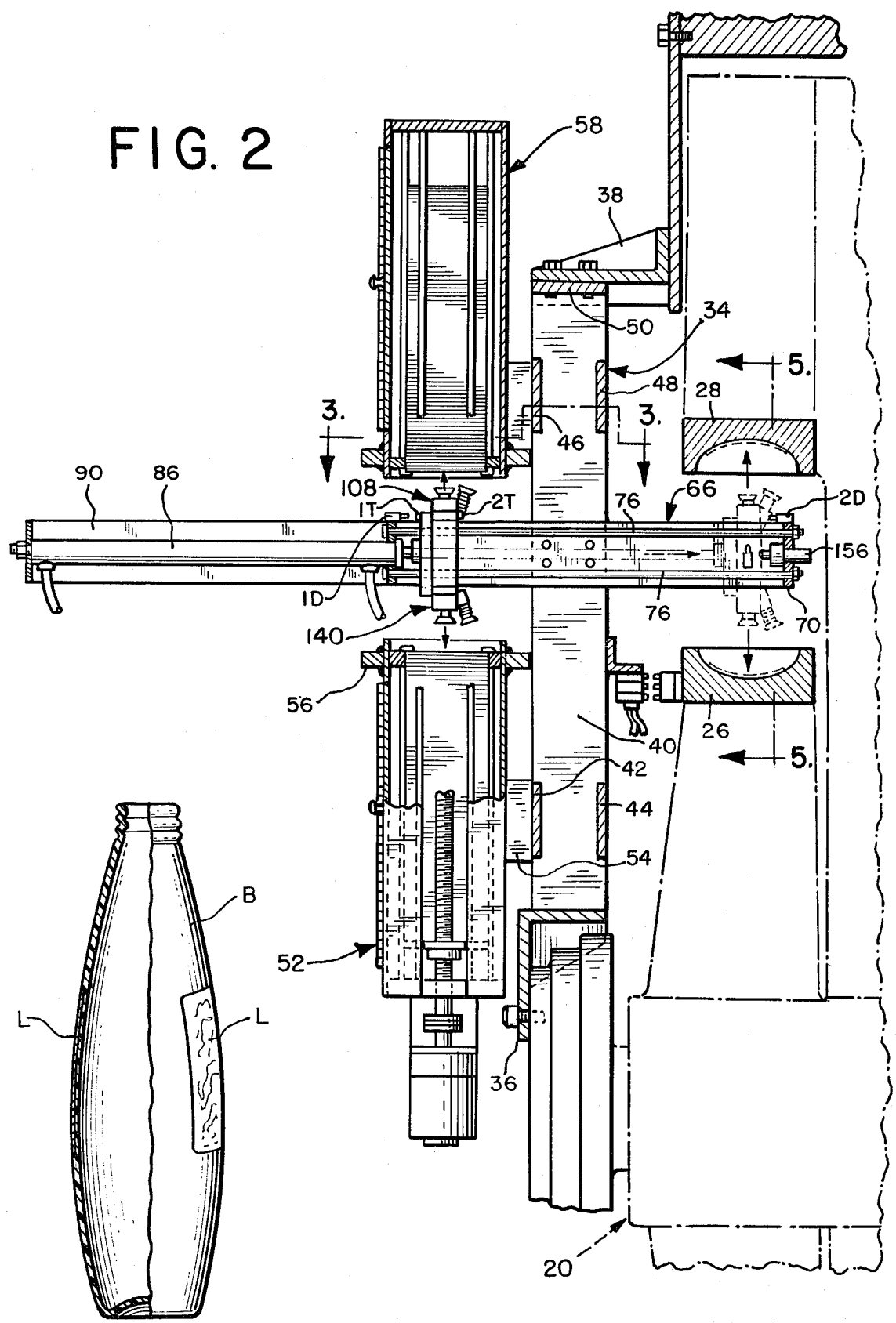
FIG. 2 is a fragmentary sectional view taken generally along the line 2—2 of FIG. 1, and shows the general details of the labeller and the relationship thereof to the blow molding machine.

The labeller 32 includes a support frame 34 which includes a lower mounting bracket 36 and an upper mounting bracket 38 which are suitably secured to fixed portions of the blow molding machine 20, as is generally shown in FIG. 2. A pair of vertical supports 40 extend between the mounting brackets 36, 38 and are rigidly connected thereto. The lower portions of the supports 40 are connected together by transverse frame members 42, 44, while upper portions of the supports are connected together by transverse frame members 46, 48. The extreme upper ends of the supports 40 are connected together by a transverse frame member 50.

Figure 4:
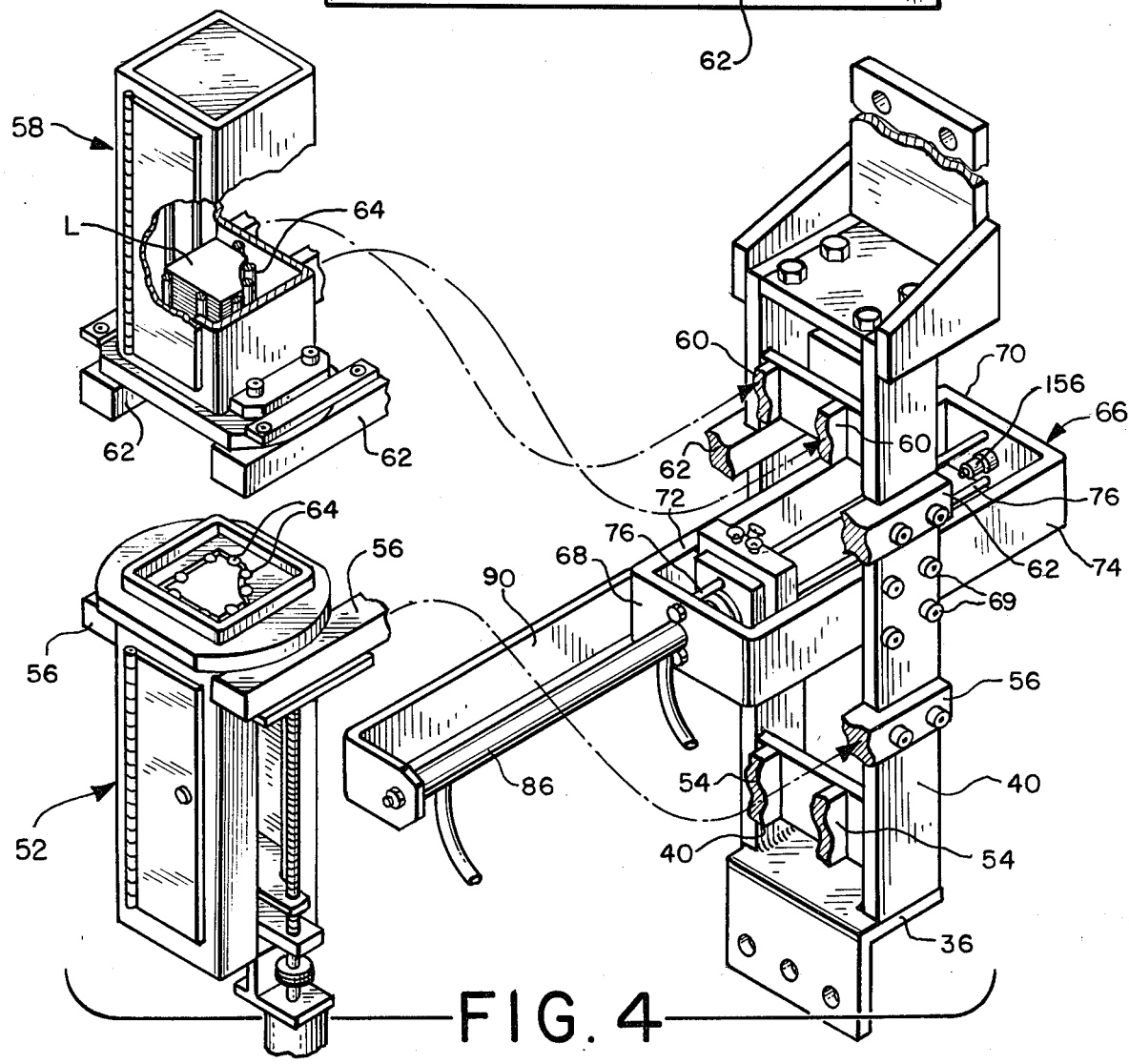
FIG. 4 is an exploded perspective view of the labeller with parts broken away and shown in section, and shows the relationship of the various components of the labeller.

A lower hopper 52 for labels is mounted by means of a pair of support arms 54 on the frame member 42 and an upper part of the hopper 52 is stabilized by a pair of upper arms 56 which extend directly from the support members 40, as is best shown in FIG. 4, stabilizing the lower hopper 52.

The upper hopper 58 is also carried by the support frame 34 and, as is best shown in FIG. 4, is secured to the frame member 46 by a pair of arms 60 and is stabilized by a pair of arms 62 which are secured directly to the support members 40.

Referring to FIG. 1, it will be seen that the hoppers 52 and 58 are tilted slightly with respect to one another so that the labels carried thereby will lie substantially in the same plane as the surface of the mold cavities to which the labels are to be applied.

Figure 3:
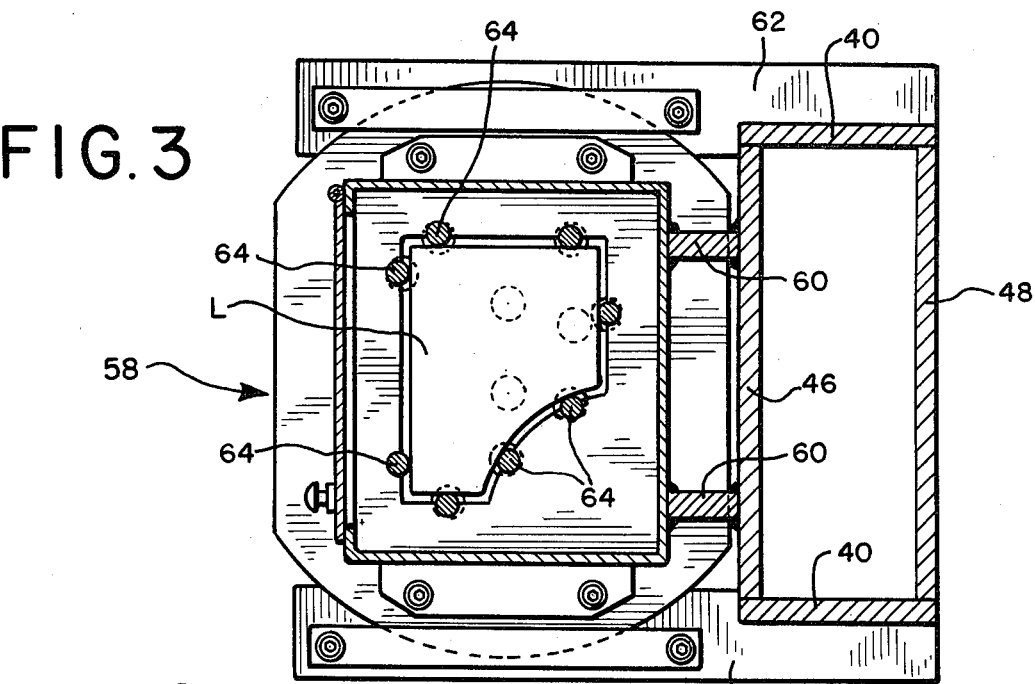
FIG. 3 is a horizontal sectional view taken generally along the line 3—3 of FIG. 2, and shows the manner in which a label is positioned within a typical hopper in aligned relation.

Referring now to FIG. 3 in particular, it will be seen that with reference to the hoppers 52 and 58, except at the discharge end of each hopper, labels L are maintained at a preset orientation by a plurality of elongated guide rods 64 which are arranged in accordance with the configuration of the particular label. Inasmuch as the hoppers are not in and of themselves novel, no further description of the hoppers is believed to be necessary.

Figure 6:
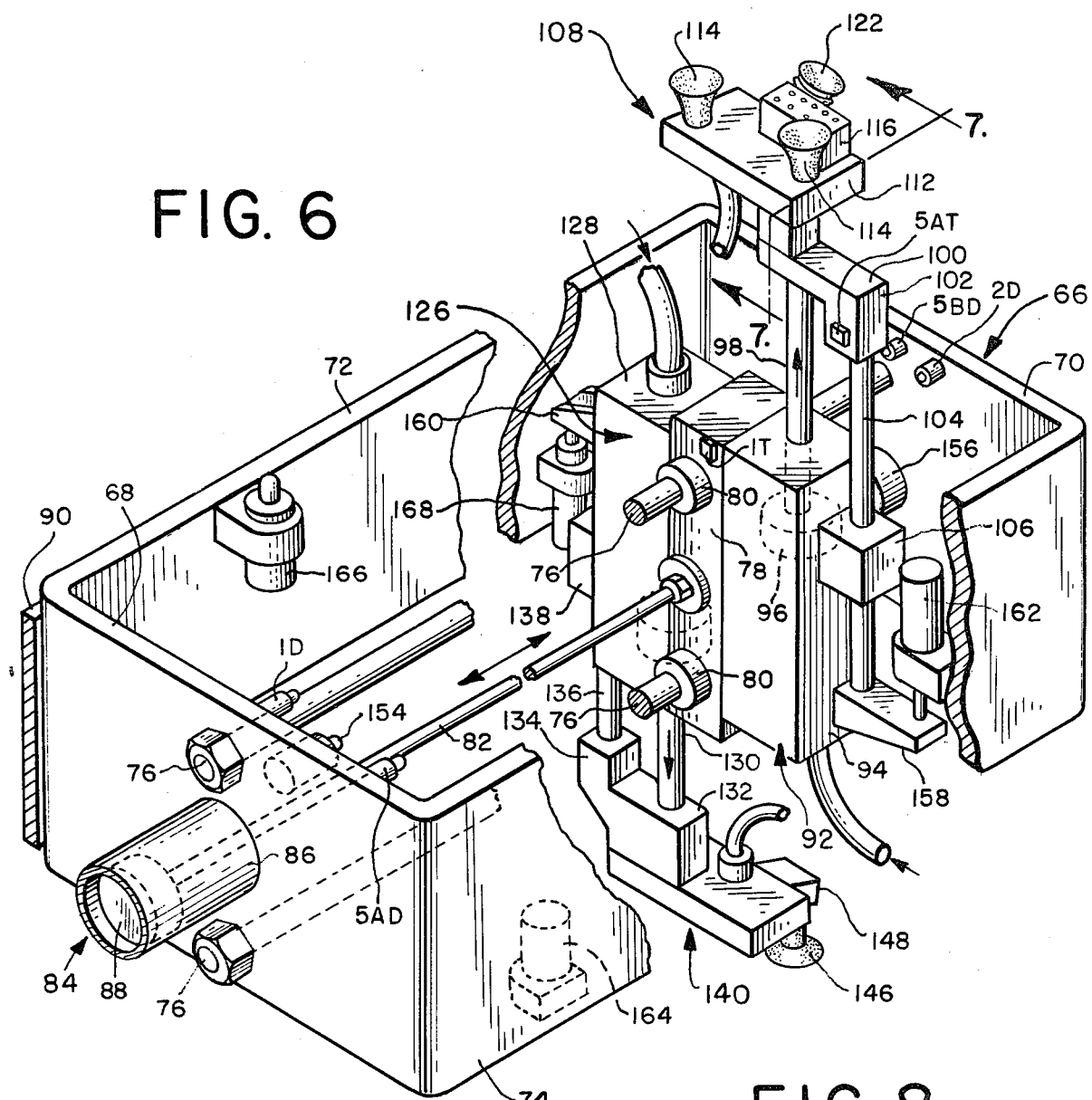
FIG. 6 is a perspective view with parts broken away and shown in section of a support frame of the labeller, and shows the details of mounting of the carriage and the pick-up heads.

The labeller also includes an open generally rectangular horizontally disposed support frame 66 which is mounted between the support members 40 and secured thereto by suitable fasteners 69, as is best shown in FIG. 4. The support frame 66, as is best shown in FIG. 6, has ends 68, 70 and sides 72, 74. A pair of combination guide and support rods 76 extend between the ends 68, 70 and are fixedly secured thereto. A carriage 78 is journalled on the rods 76 for reciprocating movement with the carriage 78 having formed therein bearing sleeves 80 to facilitate the reciprocatory movement of the carriage 78.

It will be readily apparent from FIG. 6 that the carriage 78 is primarily in the form of a rectangular block which is vertically disposed. The carriage 78 has coupled thereto an elongated piston rod 82 of an extensible fluid motor 84 of the type including a cylinder 86 having therein a piston 88 which is coupled to the piston rod 82. One end of the cylinder 86 is supported by the end 68 while the opposite end of the cylinder 86 is carried by an elongated mounting bracket 90 which is secured to the side 72 and extends therefrom beyond the end 68.

Figure 5:
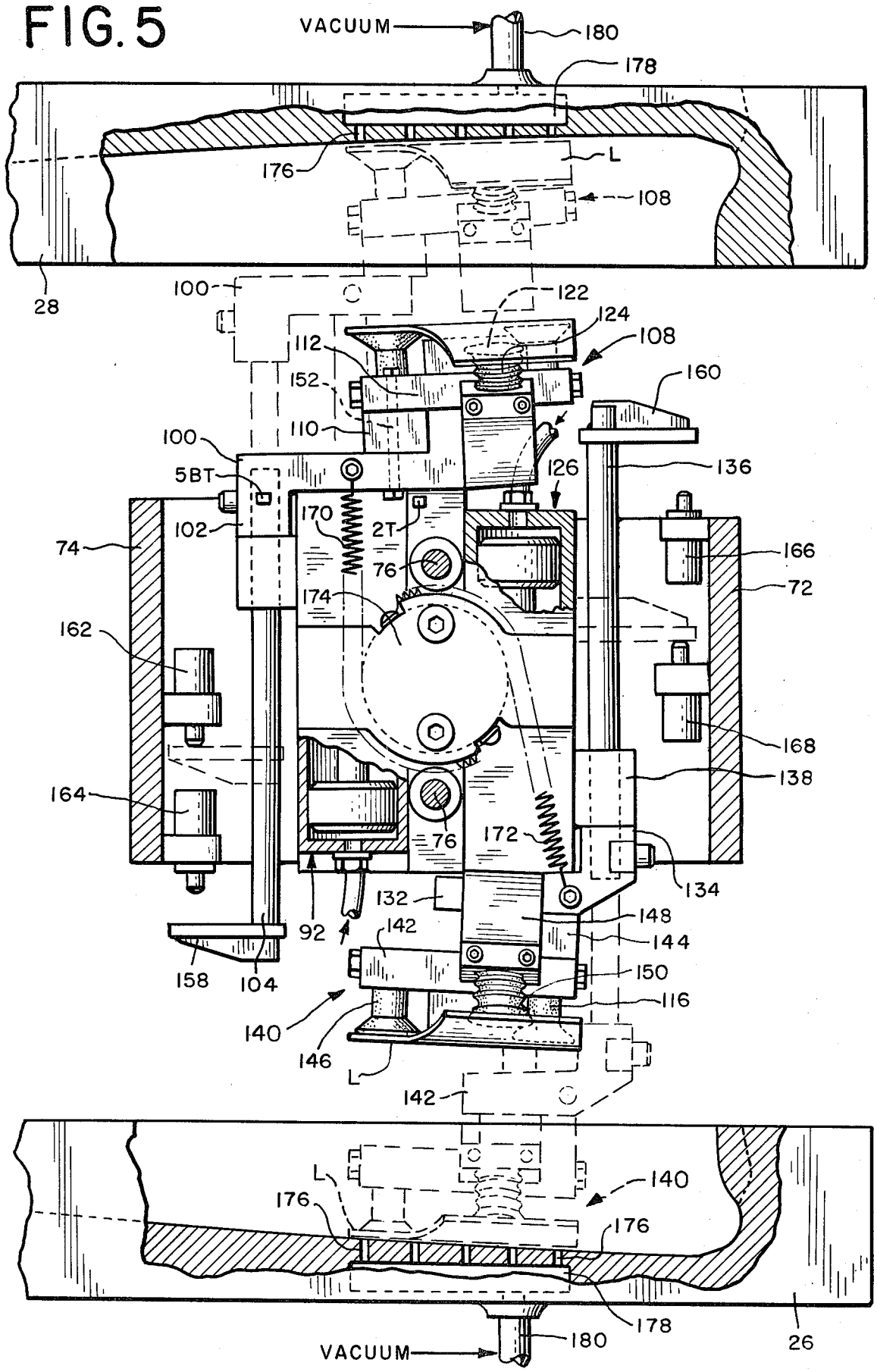
FIG. 5 is a vertical sectional view taken generally along the line 5—5 of FIG. 2, and shows the pick-up heads of the labeller in elevation and the relationship of the pick-up heads to the mold half cavities.
Figure 8:
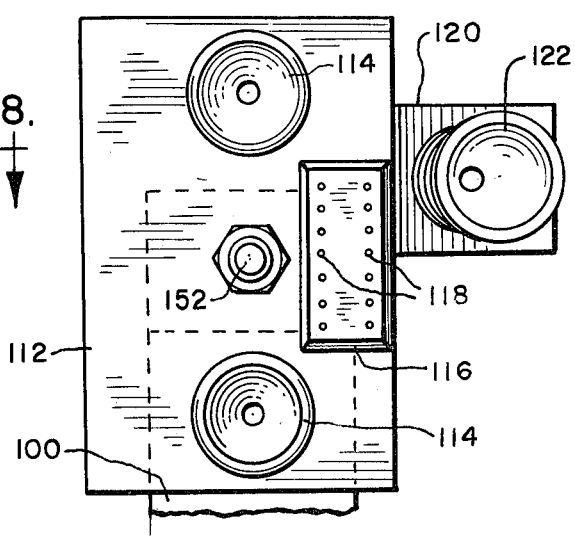
FIG. 8 is a generally horizontal view of one of the pick-up heads taken generally along the line 8—8 of FIG. 7.

To one side of the carriage 78 is a vertically disposed extensible fluid motor 92 while includes a cylinder member 94 which is generally in the form of an elongated rectangular block. The cylinder 94 has positioned therein a piston 96 to which there is connected an upstanding piston rod 98 which, in turn, is secured to the underside of a support member 100 which includes a depending extension 102. The support member 100 has connected to the extension 102 a vertical stabilizer rod 104 which, in turn, is journalled in a guide block 106 which is secured to a side of the extensible fluid motor 92. With reference to FIG. 5 as well as FIG. 6, it will be seen that the support member 100 has mounted thereon an upper pick-up head generally identified by the numeral 108, with the head 108 being spaced from the support member 100 by means of a spacer 110 which is angled so as to mount the pick-up head 108 in tilted relation to the piston rod 98 in accordance with the tilting of the upper hopper 58 and a surface of the outer mold half 28 at the time of the application of a label. The pick-up head 108 includes a head member 112 in the form of a flat plate which has projecting therefrom a pair of suction cups 114. The head member 112 also has mounted on the upper surface thereof an air block 116 which, as is best shown in FIG. 8, has a plurality of air passages 118 opening through the upper surface thereof for delivering air under pressure.

The head member 112 also has secured to one side edge thereof a mounting device 120 for a third suction cup 122. While the suction cups 114 are fixed, it is to be understood that the suction cup 122 is provided with a support such that when the mouth of the suction cup 122 is closed the suction cup is retracted. This may be accomplished either by forming the suction cup with suitable bellows 124 as shown in FIG. 5, or by supporting the suction cup by way of a piston and cylinder arrangement which may be incorporated in the block 120.

On the other side of the carriage 78 from the extensible fluid motor 92 is a second extendible fluid motor 126 which includes a generally rectangular cross-sectional upstanding cylinder block 128 having projecting from the underside thereof a downwardly directed piston rod 130. The piston rod 130 has secured thereto a generally L-shaped support 132 which includes an upstanding portion 134. The upstanding portion 134 of the support 132 is connected to a stabilizer rod 136 which is disposed parallel to the piston rod 130 and which is journalled for reciprocating movement in a guide 138 mounted on the side of the cylinder block 128.

The support 132 carries a lower pick-up head generally identified by the numeral 140 and including a head member 142. The head member 142 is spaced from the support member 132 by a spacer block 144 which may be generally wedge-shaped so as to tilt the head member 142 and thus the pick-up head 140 in accordance with the slope of the cavity of the mold half 26 at the time a label L is being applied.

The head member 142, like the head member 112, carries two fixed suction cups 146. The head member 142 also carries a block 148 which, in turn, carries a movable suction cup 150 which will be of a like construction to the above-described suction cup 122.

At this time it is pointed out that the head member 112 and the spacer block 110 are secured to the support 100 by a fastener 152 which is a break-away fastener, i.e. a fastener specifically designed to rupture under a predetermined load so that in the event the pick-up head 108 should be in the path of the mold half 28, the pick-up head 108 will break loose from the support 100 and damage to the mold half will be prevented and damage to the labeller will be minimized. The same break-away fastener will extend through the head member 142, the spacer block 144 and the support member 132 so as to permit the pick-up head 140 to break away from the support member 132 in the event the pick-up head 140 should be in the path of the moving hold half 26.

It is to be understood that the carriage 78 and the pick-up heads 108, 140 will be moved between first positions aligned with the hoppers 52, 58 for the purpose of picking up labels, and a second position where the pick-up heads will be momentarily aligned with the cavities of the mold halves 26, 28 by means of the extensible fluid motor 84. The at rest positions of the carriage 78 are determined by decelerators 154 and 156 carried by the ends 68, 70 of the support frame 66 and engageable with the carriage 78. These decelerators are best shown in FIG. 6.

The extended positions of the pick-up heads 108, 140 are controlled by step members 158, 160 which are mounted on the stabilizer rods 104, 136, respectively. The side 74 carries a pair of downwardly directed decelerators 162, 164 as is best shown in FIG. 5, while the side 72 of the support frame carries a pair of upwardly facing decelerators 166, 168. The decelerators 164, 166 are positioned adjacent the end 68 of the support frame and are aligned with the stop members 158, 160, respectively, when the pick-up heads 108, 140 are in alignment with the hoppers 52, 58 so as to limit the movement of the pick-up heads toward the labels carried by the hoppers such that the suction cups 114 of the pick-up head 108 and the suction cups 146 of the pick-up head 140 just touch or kiss the foremost label. On the other hand, the decelerators 162, 168 are positioned adjacent the end 70 of the support frame and are aligned with the stop members 158, 160 when the pick-up heads 108, 140 are in position for transferring labels to the mold halves 26, 28. The decelerators 162, 168 function to stop the pick-up heads 108, 140 with the labels L carried thereby spaced a short distance from the surface of the mold cavity, as is best shown in FIG. 5.

It is to be understood that the extensible fluid motor 84 is a double acting motor. On the other hand, the extensible fluid motors 92, 126 are double acting motors and therefore, as is best shown in FIG. 5, are provided with safety return springs 170, 172 which have first ends engaged in part about a spool 174 and have second ends secured to the support members 100, 132, respectively. The return springs 170, 172 not only assure the retraction of the pick-up heads, but also speed up the return.

Figure 7:
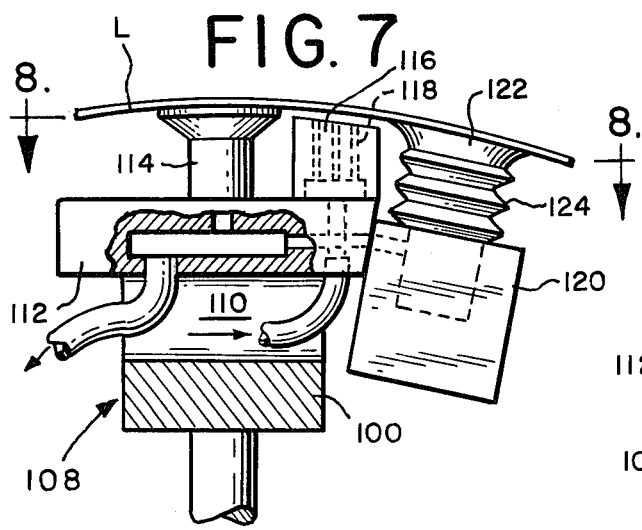
FIG. 7 is an enlarged fragmentary sectional view of a pick-up head taken generally along the line 7—7 of FIG. 6.

It is to be understood that in the normal operation of the labeller, the pick-up heads 108, 140 when aligned with the hoppers 58, 52 are extended in opposite directions to pick up labels. With reference to the pick-up head 108 as an example, as shown in FIG. 7 the suction cups 114 are fixed, and when engaged with a label will merely tightly hold such a label. On the other hand, the suction cup 122, because it is axially retractable either by way of the illustrated bellows 124 or a piston and cylinder type mount, retracts once suction is completed and serves to peel the label from the stack. Thus, the release of a single label is assured.

The pick-up heads 108, 140, once they have received labels, retract and the carriage 78 is advanced toward the opposite end of the support frame 66 until the pick-up heads are aligned with the positions where they will insert labels in the blow mold halves 28, 26, respectively. In proper timed relation to the movement of the open mold formed by the mold halves 26, 28, the pick-up heads 108, 140 will be advanced and will be stopped in positions where the labels are closely adjacent to but spaced from the surface of the respective mold cavity. However, at this time the label should no longer be in contact with its respective pick-up head in that prior to the pick-up head becoming closely adjacent the mold half surface, the vacuum to the suction cups is discontinued and air under pressure is introduced into the blocks 116 carried by the two pick-up heads and the label in each instance is, in effect, being blown off of the suction cups. The stopping momentum to the pick-up heads also adds to the discharge of the labels.

With reference to FIG. 5, it will be seen that each of the mold halves 26, 28 has formed in the surface thereof which is to receive the labels a plurality of suction passages 176 which are connected to a manifold area 178 to which a vacuum line 180 is attached. Thus, in conjunction with the double acting force to discharge the labels from the pick-up heads, the labels are drawn against the surfaces of the mold cavities. The vacuum through the vacuum passages 176 serves to maintain the labels in place within the mold cavities during the subsequent blow molding operation.

The operation of the labeller, however, is more controlled than described hereinabove.

The operation of the labeller is automatic and, as a result, electrical controls are required. These electrical controls primarily are in the form of proximity detectors. There is a proximity detector 1D mounted on the end 68 of the frame 66 which cooperates with a target 1T on the carriage 78 for determining when the carriage 78 and its pick-up heads 108, 140 are properly aligned with the hoppers 52, 58. It is to be understood that unless there is accurate alignment of the pick-up heads with the labels, there cannot be accurate positioning of the labels within the mold.

There is also a proximity detector 2D on the end 70 of the frame 66. The proximity detector 2D cooperates with a target 2T which is mounted on the carriage and indicates when the carriage and thus the pick-ups heads 102, 140 carried thereby are properly aligned with the mold halves 26, 28 so that the deposit heads will pick up labels only when the pick-up heads are properly aligned with the mold halves.

Figure 9:
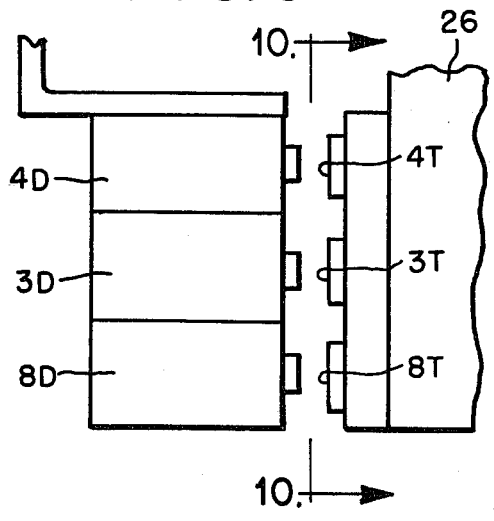
FIG. 9 is an enlarged fragmentary elevational view showing the relationship of sensors carried by the labeller and targets carried by a mold half.
Figure 10:
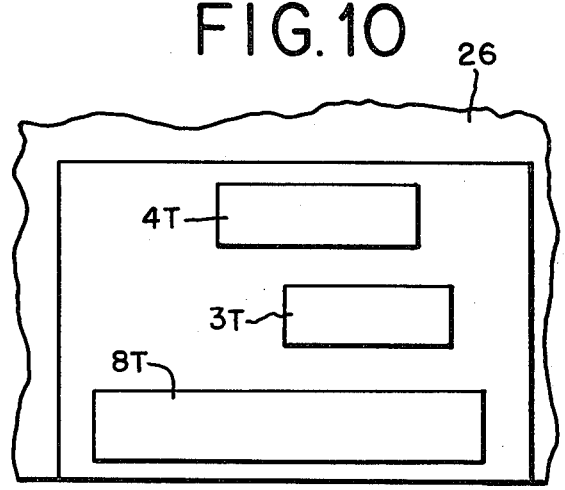
FIG. 10 is an elevational view taken generally along the line 10—10 of FIG. 9, and shows the arrangement of targets.

Referring now to FIGS. 9 and 10, it will be seen that there is a proximity detector 3D is carried by the pick-up head 140 and cooperates with a target 3T which is mounted on each of the mold halves 26 for properly indicating when the mold halves are properly positioned with respect to the pick-up heads.

A proximity detector 4D is also mounted on the pick-up head 140 for cooperation with targets 4T on each mold half 26 to determine when the vacuum to the suction cups should be turned off and air introduced to the air head 116 to effect discharging of the labels.

A safety proximity detector 5AD (FIG. 6) is also carried by the end 68 for cooperation with a target 5AT which is mounted on the head 108 as a safety to make certain that the heads are in proper position. A like safety proximity detector 5BD is mounted on the end 70 for cooperation with a target 5BT carried by the head 108. Referring once again to FIGS. 9 and 10, a proximity detector 8D is also mounted on the pick-up head 140 for cooperation with a target 8T mounted on each of the mold halves 26. The proximity detector 8D controls the advance of the pick-up heads into the mold halves when there is any misalignment of the timing of the actuation of the pick-up heads with respect to the mold halves. In other words, the target 8T, which is very long, will permit actuation of the cylinders or motors for extending the pick-up heads only when the associated mold half 26 is in its proper circumferential position relative to the fixed labeller.

At this time it is to be understood that the flow of control fluid into the fluid motors 92 and 126 is by way of a solenoid actuated control valve 1SOL which serves to actuate the double acting fluid motors 92 and 126. As previously described, the fluid motors 92 and 126 are also provided with a spring return.

It is also to be understood that the double acting fluid motor 84 is controlled by means of a solenoid control valve 2SOL which is normally set to hold the carriage 78 and the pick-up heads 108, 140 in alignment with the hoppers 52, 58 and when the control valve 2SOL is actuated it will serve to move the carriage 78 into alignment with the path of the mold halves 26, 28.

It is to be understood that the supplying of a vacuum to the suction cups 114 and 122, 146 & 150 as well as the direction of air under pressure to the air blocks 116 will be by way of a solenoid valve 3SOL which is normally set to apply vacuum to the suction cups and no air to the air blocks 116.

Figure 11:
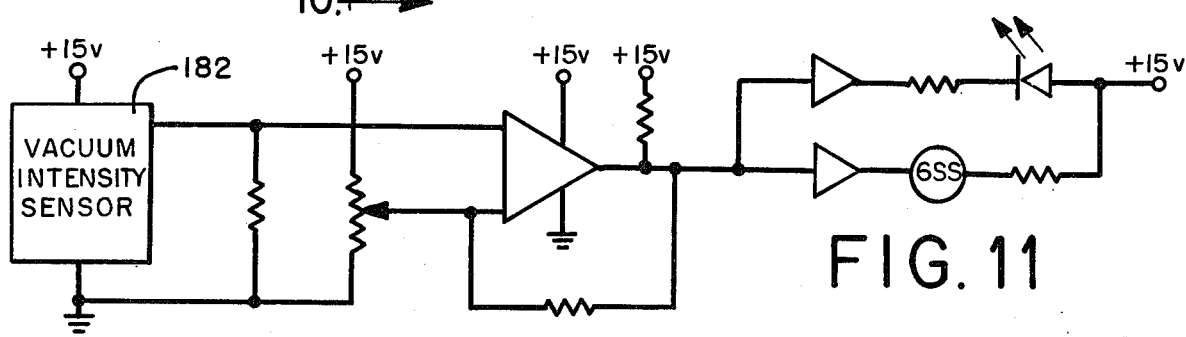
FIG. 11 is a wiring schematic of the vacuum sensor.

Finally, with reference to FIG. 11, it is to be understood that there is a circuit relay having a normally closed contact 6CRA and a normally open contact 6CRB, which circuit relay is not shown but would be identified as circuit relay 6CR and which is controlled by the vacuum within the vacuum line leading to the suction cups 114, 122, 146 & 150 so that the circuit relay 6CR is actuated only when the suction cups 114, 122, 146 & 150 are sealed by labels L to assure pick up of those labels. To this end there is a separate vacuum sensing circuit as shown in FIG. 11 which includes a purchased vacuum sensing device 182 which by way of the illustrated control circuit, when the sensed vacuum is at the proper level, actuages a solenoid of the controller 6SS which, in turn, controls the actuation of the contacts of the circuit relay 6CR.

As stated above, the carriage 78 is normally retracted to position the pick-up heads 108,140 in alignment with the labels L carried by the hoppers 58, 52, respectively. When the detector 1D indicates that the carriage is in its proper position, the relay 1CRA closes and this, associated with the normally closed relay contact 6CRA results in the energizing of the solenoid 1SOL. When the solenoid 1SOL is actuated, the cylinders or fluid motors 92, 126 for the pick-up heads are actuated to extend the pick-up heads 108, 140 to positions for engaging labels carried by the hoppers 58, 52, respectively.

When the suction cups 114, 122, 146 & 150 of the pick-up heads 108, 140 properly engage labels, the vacuum detector circuit will operate to energize the circuit relay 6CR and thus open the normally closed circuit relay contacts 6CRA opening the circuit to the solenoid 1SOL. At this time, the solenoid valve 1SOL will reverse the supplying of fluid to the motors 92, 126 and the pick-up heads 108, 140 will be retracted, assisted by the action of the return springs 170, 172.

When the relay 6CR is energized, the contacts 6CRB will close and the solenoid 2SOL will be energized through the normally closed contact 5CRA. This will result in the solenoid valve 2SOL directing fluid into the left end of the cylinder 86 to shift the carriage 78 from alignment with the hoppers to alignment with the general paths of the mold halves. The solenoid 2SOL will remain energized at the end of the carriage travel even though the contact 5CRA opens through the closing of the contact 2CRB. However, if during the movement of the carriage toward alignment with the mold halves, should one of the labels become loosened, the contact 6CRB will open and the carriage will be returned to alignment with the hoppers.

When the carriage reaches its position generally in alignment and between the paths of the mold halves, the carriage will remain fixed and the pick-up heads 108, 140 will also remain stationary until the associated mold half 26 is in its proper position. This requires that the contacts 3CRA, 8CRA and 9CRA be closed in addition to the just closed contact 2CRA.

Referring now to the control circuit for the interval timer 9IT, it will be seen that the timer is actuated only if the contacts 2CRC and 8CRB are closed before the normally closed contact 3CRB is opened. Thus, if the mold should reach the position for receiving a label before the carriage 78 reaches its position in alignment with the path of the mold halves of that mold, then the interval timer 9IT will not be energized and the contact 9CRA will not close.

If the carriage 78 reaches its position to energize the detector 2D prior to the detector 3D detecting the target 3T, the interval timer 9IT will be energized, closing contact 9CRA and effecting the energizing of the solenoid 1SOL to extend the pick-up heads 108, 140 into the mold halves 28, 26 aligned therewith.

The solenoid 3SOL which controls the vacuum and air switch is energized only when the contact 9CRB is closed and when the detector 4D detects the target 4T and causes contact 4CRA to close. It is to be understood that the cut-off of the vacuum and the introduction of air will occur at such time as the labels L are closely adjacent to their points of discharge from the pick-up heads so that the labels are released by a combination of air discharge and the sudden stopping of the pick-up heads. Further, as previously described, the labels will be drawn into the respective mold halves and be retained therein by the vacuum means formed in the mold halves.

After the labels have been discharged, the target 3T will move away from the detector 3D with the result that the contacts 3CRA will open, thereby releasing the solenoid 1SOL and causing the pick-up heads 108, 140 immediately to retract so as to be out of the way of the mold halves as the ends of the cavities thereof approach. At this time the circuit of the solenoid 2SOL is interrupted by the opening of the contact 6CRB nd with the contact 5BCRA being also open so that the solenoid valve controlled by solenoid 2SOL will reverse its position and cause retracting of the carriage 78 and the pick-up heads 108, 140 toward the end 68 and alignment with the hoppers 52, 28. When the carriage reaches its retracted position and this is detected by the detector 1D. The cycle begins anew with the pick-up heads being extended to pick up new labels.

Figure 12:
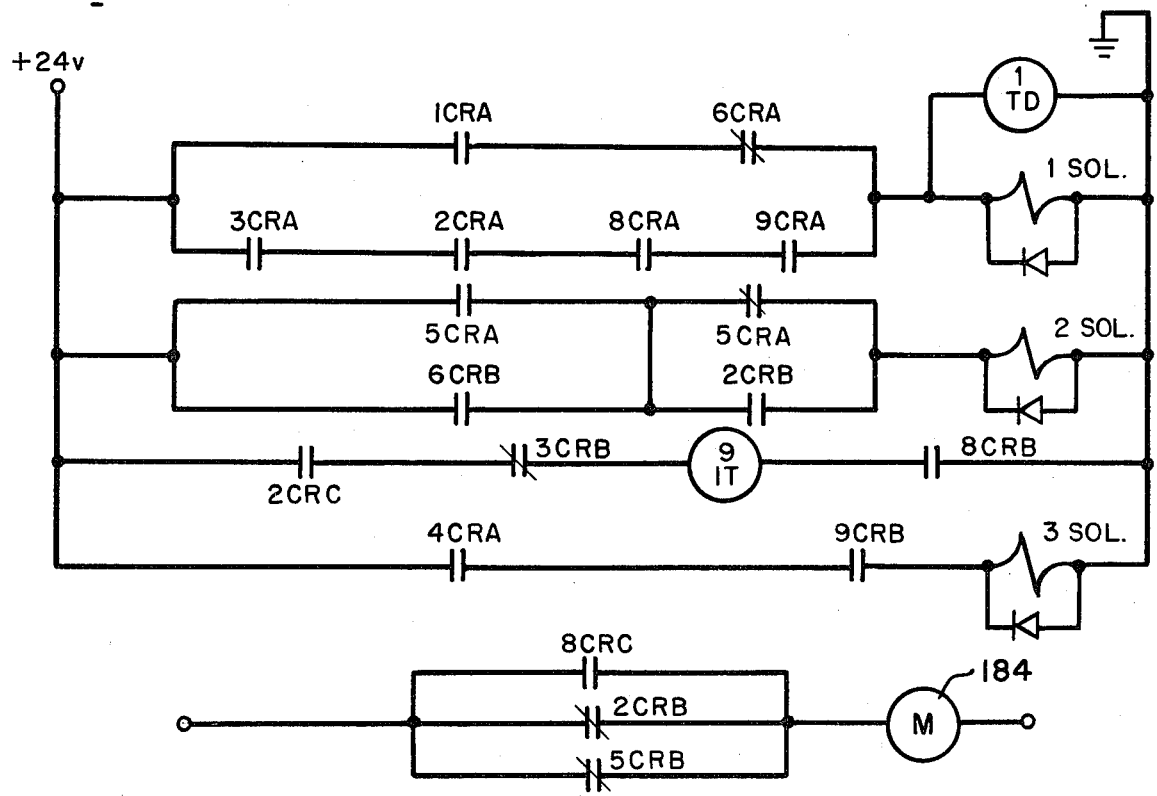
FIG. 12 is a wiring schematic of the controls for the labeller.

Referring once again to FIG. 12, it will be seen that the control for a motor 184 which rotates the wheel of the blow mold is illustrated. It will be seen that the motor 184 is energized only if one of the contacts 2CRB and 5CR remain closed or the contact 8CRC closes. Thus, should the pick-up heads not be retracted before the end of the window determined by the target 8T is reached, with the normally closed contacts 2CRB and 5CRB being opened by the carriage 78 being positioned to align the pick-up heads with the mold halves, and the temporarily closed contact 8CRC suddenly opening, the motor 184 will be de-energized to shut down the blow molding machine.

It is to be understood that while the detectors 3D, 4D and 8D and the targets 3T, 4T and 8T are arranged with respect to the fixed part of the apparatus and the moving mold halves, the detectors are in positions where they could be damaged, and therefore it is feasible also to mount the equivalent detectors and targets on other moving parts of the machine, such as the bull gear (not shown) for the wheel. Further, the rotating shaft may be provided with an encoder type control which will produce signals in accordance with the positions of the mold halves and the encoder may be utilized as a signal device in lieu of the detectors and targets.

Although only a preferred embodiment of the labeller and the controls for the automatic actuation thereof have been illustrated and described herein, it is to be understood that minor variations may be made in the labeller construction and mode of operation without departing from the spirit and scope of the invention as defined by the appended claims.

We claim:

1. An apparatus for applying labels to internal surfaces of mold cavities, said apparatus comprising a hopper for labels, a carriage, a pick-up head carried by said carriage for picking up labels from said hopper and placing such labels in open mold halves, guide means supporting said carriage for movement of said carriage along a fixed path to move said pick-up head between a first position aligned with said hopper to a second position in between the path of open mold halves back and forth positioning means connected to said carriage for selectively moving said pick-up head to a selected one of said first and second positions, and extensible means carried by said carriage for selectively moving said pick-up head between a retracted position and label engaging and discharge positions.

2. An apparatus according to claim 1 wherein there is a fixed support including guide members engaged with said carriage and defining the path of said carriage, and said positioning means includes an extensible fluid motor fixed relative to said support.

3. Apparatus according to claim 2 wherein said support includes a generally rectangular open housing having ends and sides, said guide members extending between said ends, and stop means cooperable between said ends and said carriage to limit the movement of said carriage and determining said first and second positions.

4. Apparatus according to claim 2 wherein said support includes a generally rectangular open housing having ends and sides, said guide members extending between said ends, and stop means cooperable between said sides and said pick up head to limit movement of said pick-up head relative to both said hopper and mold halves to which labels are being applied.

5. Apparatus according to claim 1 wherein said extensible means are mounted on opposite sides of said carriage and face in opposite directions.

6. Apparatus according to claim 5 wherein each of said extensible means is an extensible fluid motor having a movable support rod, a stabilizer rod mounted parallel to said support rod and mounted for guided axial movement, and a support for the respective one of said pick-up heads extending between and connected to said support rod and said stabilizer rod.

7. An apparatus according to claim 6 wherein each of said pick-up heads is secured to a respective support by a breakaway fastener whereby should a pick-up head actuation be out of time to mold movement and be struck by a mold half the struck pick-up head will break loose and prevent damage to other components.

8. An apparatus according to claim 6 wherein each stabilizer rod carries a stop member for limiting movement of a respective pick-up head toward both a respective label hopper and a blow mold half.

9. An apparatus according to claim 8 wherein there is a separate stop element for association with each of said stop members for said first and second positions.

10. An apparatus according to claim 1 together with control means for actuating said positioning means and said extensible means in accordance with the position of mold halves relative to said carriage.

11. An apparatus according to claim 1 together with control means for actuating said positioning means and said extensible means in accordance with the position of mold halves relative to said carriage and the picking up of labels.

12. An apparatus according to claim 1 wherein said apparatus is positioned relative to a blow molding machine of the type including a rotating wheel carrying a plurality of split molds which are circumferentially spaced and open radially, and control means for actuating said positioning means and said extensible means in accordance with the position of mold halves relative to said carriage.

13. An apparatus according to claim 12 wherein said control means includes cooperating detectors and targets between said apparatus and at least one mold half of each mold for controlling the operation of said extensible means only at a time when said pick-up heads may safely enter and retract from respective moving mold halves.

14. Apparatus according to claim 13 wherein there are targets of different effective lengths, one of said targets defining an operation window and another for actuating said positioning means to assure accurate positioning of labels.

15. Apparatus according to claim 13 wherein said targets are carried by moving mold halves and said detectors are fixed.

16. Apparatus according to claim 13 wherein one of said targets and detectors controls means for timing the discharge of labels from said pick-up heads in accordance with mold position.

17. Apparatus according to claim 13 together with detectors for detecting the positions of said carriage at said first and second positions and restricting operation of said extensible means to only times when said carriage is in one of said first and second positions.

18. Apparatus according to claim 12 together with detectors for detecting the positions of said carriage at said first and second positions and restricting operation of said extensible means to only times when said carriage is in one of said first and second positions.

19. Apparatus according to claim 12 together with further control means responsive to labels being carried by said pick-up heads.

20. Apparatus according to claim 19 wherein said pick-up heads include suction cups for engaging and picking up labels, and said further control means includes vacuum level sensing means.

21. Apparatus according to claim 11 wherein said control means responsive to the picking up of labels includes means for rendering said apparatus inoperative in the event of label pick-up failure.

22. Apparatus according to claim 1 wherein there are two of said hoppers and said hoppers are in spaced apart and opposed relation, and there are two of said pick-up heads, one for each of said hoppers, said pick-up heads being arranged in oppositely facing relation.

23. An apparatus according to claim 22 together with control means for actuating said positioning means and said extensible means in accordance with the position of mold halves relative to said carriage and the picking up of labels.

24. Apparatus according to claim 23 wherein said control means responsive to the picking up of labels includes means for rendering said apparatus inoperative in the event of failure of either of said pick-up heads to pick up a label.

* * * * *